Patented Nov. 8, 1949

2,487,261

UNITED STATES PATENT OFFICE 2,487,261

LOW-TEMPERATURE GREASE

John C. Zimmer, Union, and Arnold J. Morway, Rahway, N. J., assignors to Standard Oil Development Company, a corporation of Delaware No Drawing. Application September 24, 1947, Serial No. 775,960

7 Claims. (Cl. 252—29)

This invention relates to low temperature greases and particularly to low temperature greases containing carbon black. It also relates to a method of producing carbon black greases and includes a special treatment of carbon black to facilitate dispersion thereof in oil. It relates also to improvements which render such greases resistant to oxidation and structural instability.

In the past the use of carbon black thickeners in grease has been known and in fact greases of good body and reasonable stability against mechanical working have been prepared, using certain types of so-called "structure" carbon blacks such as the finer channel blacks or more especially acetylene black. However, channel black of small particle size is very hard to disperse uniformly in mineral oil. Furthermore, its presence appears to promote rapid oxidation and deterioration of the oil with the result that greases formed of mineral oil containing channel black have been somewhat unsatisfactory from the standpoint of oxidation stability, a difficulty which has not been overcome by the use of conventional oxidation inhibitors.

One aspect of this invention involves the combination of channel black with acetylene black. Greases have been prepared in the past by combining acetylene black with channel black in order to secure a good grease structure while at the same time avoiding undue absorption of certain desired additives such as extreme pressure additives. According to the present invention, however, acetylene black is used in combination with channel black which is modified by the treatment with certain chlorides of methyl silicon and subsequent hydrolyzing. Such a composition is found to have particular advantages, as will be more particularly pointed out hereinafter.

Accordingly it is an object of our invention to improve the stability and resistance to oxidation of low temperature greases of the carbon black type, while at the same time facilitating the preparation of such greases. A further object is to treat a carbon black, prior to its introduction into a mineral oil, particularly a low viscosity mineral oil, so as to facilitate thorough dispersion of the carbon black. Other objects will appear as this description proceeds.

In the preparation of greases of the character mentioned above, the light and highly fluid mineral oils are preferably used. While such oils have desirable low temperature characteristics for this purpose, they do not have sufficient body to pick up readily and assimilate the carbon black as it is stirred into the oil. Hence, considerable mechanical difficulty is encountered when it is attempted to obtain a good dispersion of carbon black in light low-pour point oils.

In addition to the difficulties just mentioned, the dispersion of channel blacks in mineral oil tends to cause a rapid deterioration of the oil due to oxidation. The carbon black of small particle size itself appears to catalyze oxidation, as may be shown by subjecting a composition of this type to pressure in an oxygen atmosphere, as in the Norma-Hoffman bomb oxidation test. Rapid deterioration of the oil occurs and the grease is found to be quite unstable against oxidation.

Although certain oxidation inhibitors, especially those of the amine type, are widely used for various purposes in the petroleum industry and particularly in oils and greases, we have found that prior art greases containing substantial quantities of channel black cannot be materially stabilized against oxidation by their use alone. Thus the well known phenolic, amine and other strong organic oxidation inhibitors have been found to be rather ineffective in channel black greases or in greases of the so-called "structure" black or acetylene black type which also contain channel black.

We have now discovered not only that oxidation resisting properties may be improved, but also the dispersion of the finer carbon blacks such as channel blacks in low viscosity mineral oil fractions, of the type referred to above, can be greatly facilitated by first coating the channel black with certain chlorine substituted organic silicon compounds. Thus a methyl or an ethyl silicon chloride, having a formula such as

or

or in general

where R is a methyl or ethyl or higher alkyl group and $x$ and $y$ are each integers of 1 to 3, totaling 4, may be used to coat the channel black in such a manner that it can readily be dispersed in highly fluid mineral oil. Such coating may be accomplished in various ways.

One method of coating the carbon black consists in placing the black in a long tube equipped with means for agitating or floating the carbon black by blowing in an inert gas such as nitrogen at a controlled rate into one end of the tube. The other end of the tube is equipped with a screen or filter capable of allowing the gas to escape while the black is retained. While the black is thus agitated and held more or less in suspension, the methyl, ethyl or other silicon chlorides are distilled and introduced with or in lieu of the inert gas into the agitated carbon black. The organic silicon compound condenses on the carbon black and thereafter steam is introduced with the inert gas to hydrolyze the coating material. As a result the chlorides of the organic silicon, e. g. methyl silicon, appear to be hydrolyzed to methyl or ethyl silicon hydroxides having the approximate formula $(R)_xSi(OH)_y$ where R, $x$ and $y$ have the same significance as above. This product remains as a coating on the surface of the carbon particles. Subsequently, the carbon black is washed in water to remove any residual hydrogen chloride and thereafter the black is dried. We have found that black treated in this manner readily disperses in mineral oil, even in mineral oils of very low viscosity. Hence the preparation of carbon black greases for very low temperature use is facilitated. Furthermore, the treatment does not appear to affect the bodying or thickening properties of the colloidal or fine particle channel black. The use of such coating in connection with the larger particle size acetylene black is also feasible but is not usually necessary since acetylene black disperses quite readily even in the lighter hydrocarbons.

The treatment just described largely solves the problem of dispersing fine particle channel blacks in mineral oil. Greases thickened only with such channel black may sometimes be used. Usually, however, other steps are necessary to improve the consistency, physical stability and oxidation resistance of the greases prepared from channel blacks. Preferably acetylene black, which has superior grease-structure forming characteristics, is combined with channel black in suitable proportions.

Previous investigations have shown that when greases are prepared by the dispersion of acetylene carbon black alone in light mineral oil distillates, that is, oils of low viscosity and low pour point, the products are not always satisfactory, having somewhat deficient physical structures. Greases so prepared have sometimes been found to be grainy and subject to considerable oil bleeding. The colloidal structure apparently is loose and not sufficiently knitted together to retain the oil in situ.

We have found that greases of the above character may be made quite resistant to oxidation by the use of common anti-oxidants such as the phenolic, amine and other well known oxidation inhibitors of the prior art. Hence mixtures of acetylene black, untreated, and channel blacks coated with methyl, ethyl, or other alkyl silicon hydroxides as described above, may be combined and compounded readily in low viscosity, low pour distillates. The resulting product is easily prepared and has an excellent physical structure. It is smooth, black and glossy in appearance and appears to retain the excellent oxidation stability of the acetylene black greases which are satisfactory in this respect although somewhat deficient by themselves in physical stability.

An example of this product and its method of preparation is as follows:

| | Per cent |
|---|---|
| Channel black (Ink black) treated with mixed chlorides of methyl silicon | 9.0 |
| Acetylene black | 5.0 |
| Phenyl-alpha-naphthylamine | 1.0 |
| Zinc naphthenate | 1.0 |
| Mineral oil (50 S. S. U. vis. @ 100° F. | 84.0 |

In the preparation of this compound mixed blacks are added to a usual type grease kettle having paddles and equipped with side and bottom scrapers. Mineral oil is added gradually in small portions during agitation. Each addition of mineral oil is thoroughly mixed with the carbon black until a thorough dispersion is obtained. A small portion of the oil is withheld from the grease and the inhibitors, zinc naphthenate and phenyl-alpha-naphthylamine, in this instance, are dissolved in the oil withheld at a temperature of approximately 150° F. After the major portion of oil and the carbon blacks have been mixed to a smooth homogeneous consistency, the final portion of oil containing the dissolved inhibitors is added and incorporated into the lubricant. Obviously these inhibitors can be mixed into the oil at various temperatures from ordinary room temperature up to 200° F. or more, although temperatures preferably are kept below 200° F.

A composition as described above may also be prepared by the following method with even greater facility. The treated channel black and the untreated acetylene black, stirred together, are mixed with the mineral oil without regard to complete homogeneity. This black oil mixture is then pumped from the mixing kettle to a conventional Lancaster disperser where it is thoroughly mixed and rendered smooth and homogeneous. This mixture is next pumped to a second mixing kettle of conventional type where the final quantity of oil containing the inhibitor in solution is added. The temperature may be adjusted in each of the mixing and dispersing devices as may be required. Normally the temperature will range from ordinary room temperature to 200° F. or even 250° F. or more. Heating, however, is usually not necessary.

Tests of the grease compositions described above, to determine pressure-wear characteristics, were obtained by using a standard four ball testing apparatus such as employed by the Army Air Forces at Wright Field. The results of such test indicate that the lubricants described above and prepared according to the method set forth, pass standard rigid requirements for low temperature greases of this character. Thus, the pressure wear index was found to be above 15.0 which is very satisfactory. By comparison, a standard non-carbon black lubricant showed an index of less than 6 and a typical lime soap grease specially prepared for low temperature uses showed an index of less than 8.

The following table shows the results of oxidation tests on various compositions containing some or all of the ingredients mentioned hereinabove. The percentages indicated are by weight. In those cases where zinc naphthenate was used as a structure stabilizer, there appeared to be somewhat less tendency to oil separation than where it was not used.

*Norma-Hoffman bomb oxidation test, 210° F. bath temperature; 110 p. s. i. initial oxygen pressure*

| | Lubricant | Appearance | Number of Hours for Five Pound Drop in Oxygen Pressure |
|---|---|---|---|
| 1 | 18.0% Channel black, 82.0% Mineral oil, 35 SSU at 100° F | Excellent, but black hard to disperse in oil | 22 |
| 2 | 18.0% Channel black (Treated with methyl silicon chloride), 82.0% Mineral oil, 35 SSU at 100° F. | Excellent. Easy to disperse black in oil | 24 |
| 3 | 18.0% Channel black, 1.0% Phenyl-alpha-naphthylamine, 1.0% Zinc naphthenate, 80.0% Mineral oil, 35 SSU at 100° F. | Excellent, but black hard to disperse in oil | 62 |
| 4 | 10.0% Acetylene black, 90.0% Mineral oil, 35 SSU at 100° F | Grainy and dull, grayish color, easy to disperse | 66 |
| 5 | 10.0% Acetylene black, 88.0% Mineral oil, 35 SSU at 100° F., 1.0% Phenyl-alpha-naphthylamine, 1.0% Zinc naphthenate. | ....do.... | 254 |
| 6 | 9.0% Channel black, 5.0% Acetylene black, 86.0% Mineral oil, 35 SSU at 100° F. | Excellent, but black hard to disperse in oil | 50 |
| 7 | 9.0% Channel black (Treated with methyl silicon chloride), 5.0% Acetylene black, 86.0% Mineral oil, 35 SSU at 100° F. | Excellent. Easy to disperse black in oil | 55 |
| 8 | 9.0% Channel black (Treated with methyl silicon chloride), 5.0% Acetylene black, 1.0% Phenyl-alpha-naphthylamine, 1.0% Zinc Naphthenate, 84.0% Mineral oil, 35 SSU at 100° F. | Excellent. Easy to disperse black in oil | 170 |

While the above data are limited to the use of phenyl-alpha-naphthylamine as the oxidation inhibitor and methyl silicon chloride as the carbon black coating material, it will be understood that other inhibitors may be used and that other treating agents such as various other methyl and/or ethyl silicon chlorides, or mixtures thereof, may be employed for facilitating dispersion of the channel carbon black. The treating compounds may have 1, 2 or 3 chlorine atoms attached to the silicon, preferably two. It will be further understood that the quantities and proportions of the various materials may be varied considerably. Thus the grease composition may comprise 65 to 95% by weight, preferably 70 to 90%, and more particularly 80 to 90% of lubricating oil of appropriate grade and viscosity, 3 to 20% of channel black, 2 to 15% of acetylene black, 0.1 to 3% or even more of the stabilizer or inhibitor, and minor quantities of other conventional additives such as tackiness agents, viscosity index improvers, extreme pressure agents, oiliness agents, and the like. The use of a metal soap stabilizer such as zinc naphthenate is preferred, and other metal soaps of fatty acids may be substituted. If desired, however, the soap type stabilizer may be omitted where physical or structural stability is less essential.

The total quantity of carbon black, i. e. channel black plus acetylene black may be varied from about 5% to 35% by weight, based on the total composition, but normally it will not be less than about 10% nor more than about 28%. Other modifications and variations in composition may be made within the scope of the following claims as will be apparent to those skilled in the art.

We claim:

1. A lubricating grease composition consisting essentially of 80 to 90% by weight of mineral lubricating oil, 5 to 15% of channel black coated with mixed hydroxides of $C_1$ to $C_2$ alkyl silicon to facilitate dispersion in said oil, 3 to 10% of acetylene black, and 0.1 to 2% zinc naphthenate.

2. A lubricating grease composition consisting essentially of 84% by weight of about a low viscosity mineral lubricating oil, about 9% channel black coated with mixed hydroxides of methyl silicon, about 5% acetylene black, about 1% phenyl-alpha-naphthylamine, and about 1% zinc naphthenate.

3. The process of compounding low temperature carbon black greases which comprises pretreating about 3 to 20% by weight based upon the total composition of a channel carbon black with a chlorine substituted $C_1$ to $C_2$ alkyl silicon composition and thereafter hydrolyzing said silicon composition to facilitate dispersion of said black in mineral oil, adding about 2 to 15% by weight based upon the total composition of an acetylene black to said treated carbon black, stirring said blacks into a low viscosity mineral base lubricating oil, and adding 0.1 to 3% of zinc naphthenate.

4. A lubricating grease composition consisting essentially of 70 to 90% by weight of a mineral base lubricating oil, 2 to 20% of a channel carbon black coated with a material having the approximate formula $R_xSi(OH)_y$, wherein R is an alkyl radical having not more than 3 carbon atoms and x and y are integers 1 to 3, totaling 4, 2 to 15% of acetylene black, and 0.1 to 3% by weight based upon the total composition of zinc naphthenate.

5. The process of preparing a lubricating grease composition of the carbon black thickened type having both a channel carbon black and an acetylene black therein, which method comprises first coating said channel black with a chlorine substituted organo-silicon chloride of the general formula $R_xSiCl_y$, where R is an alkyl group of 1 to 2 carbon atoms, and x and y are integers of 1 to 3, totaling 4, then hydrolyzing said coating to an alkyl silicon hydroxide, thereafter dispersing 3 to 20% of said treated black and 2 to 15% of said acetylene black, based on the total weight of the final composition, into a mineral base lubricating oil to thicken said oil to a grease consistency.

6. Process according to claim 5 wherein said channel black is coated by condensing vapors of said organo-silicon chloride and thereafter treating with steam to hydrolyze said chloride.

7. A lubricating grease composition consisting essentially of a mineral base lubricating oil thickened to a grease consistency with 3 to 20% by weight, based on the total composition, of a channel carbon black coated with a $C_1$ to $C_2$ alkyl silicon hydroxide, and 2 to 15% of acetylene black.

JOHN C. ZIMMER.
ARNOLD J. MORWAY.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,349,058 | Swenson | May 16, 1944 |
| 2,377,600 | Barker et al. | June 5, 1945 |
| 2,435,655 | Rhodes et al. | Feb. 10, 1948 |
| 2,453,153 | Morway et al. | Nov. 9, 1948 |